US008613855B2

(12) United States Patent
Talloen

(10) Patent No.: US 8,613,855 B2
(45) Date of Patent: Dec. 24, 2013

(54) WASTE WATER TREATMENT APPARATUS

(75) Inventor: Marc Talloen, Turnhout (BE)

(73) Assignee: Matala Water Technology Co., Ltd., Taichung (TW)

( * ) Notice: Subject to any disclaimer, the term of this patent is extended or adjusted under 35 U.S.C. 154(b) by 582 days.

(21) Appl. No.: 12/982,327

(22) Filed: Dec. 30, 2010

(65) Prior Publication Data

US 2011/0163019 A1 Jul. 7, 2011

(30) Foreign Application Priority Data

Dec. 31, 2009 (TW) .............................. 98146259 A

(51) Int. Cl.
*C02F 3/06* (2006.01)
*C02F 9/08* (2006.01)
(52) U.S. Cl.
USPC ........ 210/151; 210/257.1; 210/259; 210/298; 210/299; 210/312
(58) Field of Classification Search
USPC ............... 210/151, 257.1, 259, 298, 299, 312
See application file for complete search history.

(56) References Cited

U.S. PATENT DOCUMENTS

| 3,878,097 A * | 4/1975 | Mochizuki et al. ........... 210/151 |
| 4,008,159 A * | 2/1977 | Besik ............................ 210/601 |
| 5,336,402 A * | 8/1994 | Yamamoto et al. ........... 210/194 |
| 2008/0173581 A1* | 7/2008 | Maclean ....................... 210/620 |

\* cited by examiner

*Primary Examiner* — Terry Cecil
(74) *Attorney, Agent, or Firm* — Ming Chow; Sinorica, LLC

(57) ABSTRACT

A waste water treatment apparatus includes a physical filter unit. The physical filter unit includes a filter screen layer therein to filter impurities which are large particles and a distal end connected with a changeable fluid dirt activation unit to discharge the bubbles and particles of the waste water. A side wall of the storage cylinder is provided with a storage pipe to communicate with the top of at least one microorganism filter unit. The microorganism filter unit includes a microorganism filter cylinder to purify the waste water through microorganisms. The waste water treatment apparatus further includes a water storage unit. The water storage unit includes a water storage cylinder to collect the treated water for use.

16 Claims, 8 Drawing Sheets

WASTE WATER TREATMENT APPARATUS

BACKGROUND OF THE INVENTION

1. Field of the Invention

The present invention relates to a waste water treatment apparatus.

2. Description of the Prior Art

Nowadays, water source is more and more valuable. How to circulate water and reuse waste water is a topic for discussion. Referring to FIG. 1, a conventional waste water treatment system 10 disclosed in U.S. Patent Application Publication No. 2008/173581 A1 comprises a waste water storage tank 11, a treatment vessel 12 and a treated water tank 13. The waste water storage tank 11 is used to store the domestic waste water. The waste water flows to the treatment vessel 12 through an inlet pipe 111 for treatment. The treatment vessel 12 comprises an activated particles layer 121 and a sand layer 122 therein. The water is first treated by the microorganism of the activated particles layer 121 to absorb the impurities of the water, and then filtered by the sand layer 122. The filtered water flows to the treated water tank 13 through a drain pipe 123 for use. Furthermore, the treated water tank 13 is communicated with the treatment vessel 12 through a pressurization pipe 13.

The activated particles layer 121 of the conventional waste water treatment system 10 must be continuously mixed during operation to get a better absorption effect. It is required to replace the microorganism of the activated particles after a period of use. The sand layer 122 is able to separate the impurities, but the impurities will be kept on the sand layer 122. After a period of time, the sand layer 122 will be clogged by the impurities and the water cannot pass the sand layer 122. It is necessary to start the pump provided in the treated water tank 13 to pressurize the treated water, and the treated water flows back through the pressurization pipe 14 to the treatment vessel 12 to disturb the sand layer 122, so that the sand layer 122 can restore the filtering effect again. The gravel sand of the sand layer 122 will be gradually decreased after cleaning many times. It is necessary to resupply or replace the gravel sand. When cleaning, the treated water may be used, which lowers the efficiency of the waste water treatment system. Accordingly, the inventor of the present invention has devoted himself based on his many years of practical experiences to solve this problem.

SUMMARY OF THE INVENTION

The primary object of the present invention is to provide a waste water treatment apparatus which comprises a physical filter unit. The physical filter unit comprises a filter screen layer therein to filter impurities which are large particles and a distal end to connect with a changeable fluid dirt activation unit. The changeable fluid dirt activation unit comprises a storage cylinder. The storage cylinder comprises a movable funnel unit at a central portion thereof. The storage cylinder further comprises an annular bubble generator therein to discharge the bubbles and particles of the waste water. A side wall of the storage cylinder is provided with a storage pipe to communicate with the top of a microorganism filter unit. The microorganism filter unit comprises a microorganism filter cylinder. The microorganism filter cylinder comprises a funnel, a microorganism filter screen, an air supply ring, a filter screen, and a dirt storage trough therein from top to bottom. The waste water treatment apparatus further comprises a water storage unit. The water storage unit comprises a water storage cylinder to collect the treated water for use. The filter parts of the present invention can be used for a long time without replacement. It is not necessary to pump the treated water to the waste water treatment apparatus for cleaning the filter parts. There is no need for purchasing the consuming materials to lower the cost.

DETAILED DESCRIPTION OF THE PREFERRED EMBODIMENTS

Embodiments of the present invention will now be described, by way of example only, with reference to the accompanying drawings.

Figure 1:
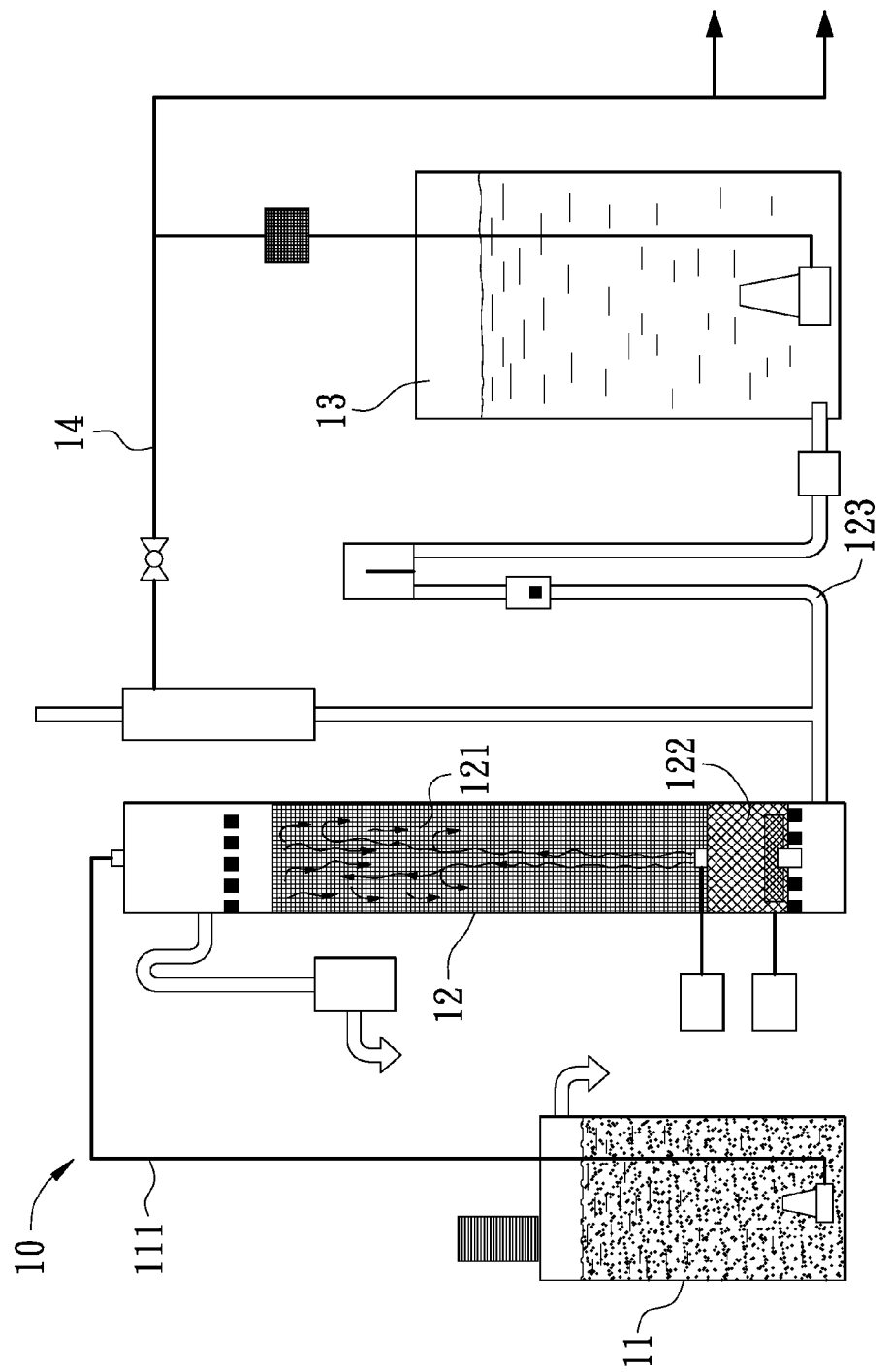
FIG. 1 is a schematic view showing a conventional waste water treatment apparatus.
Figure 2:
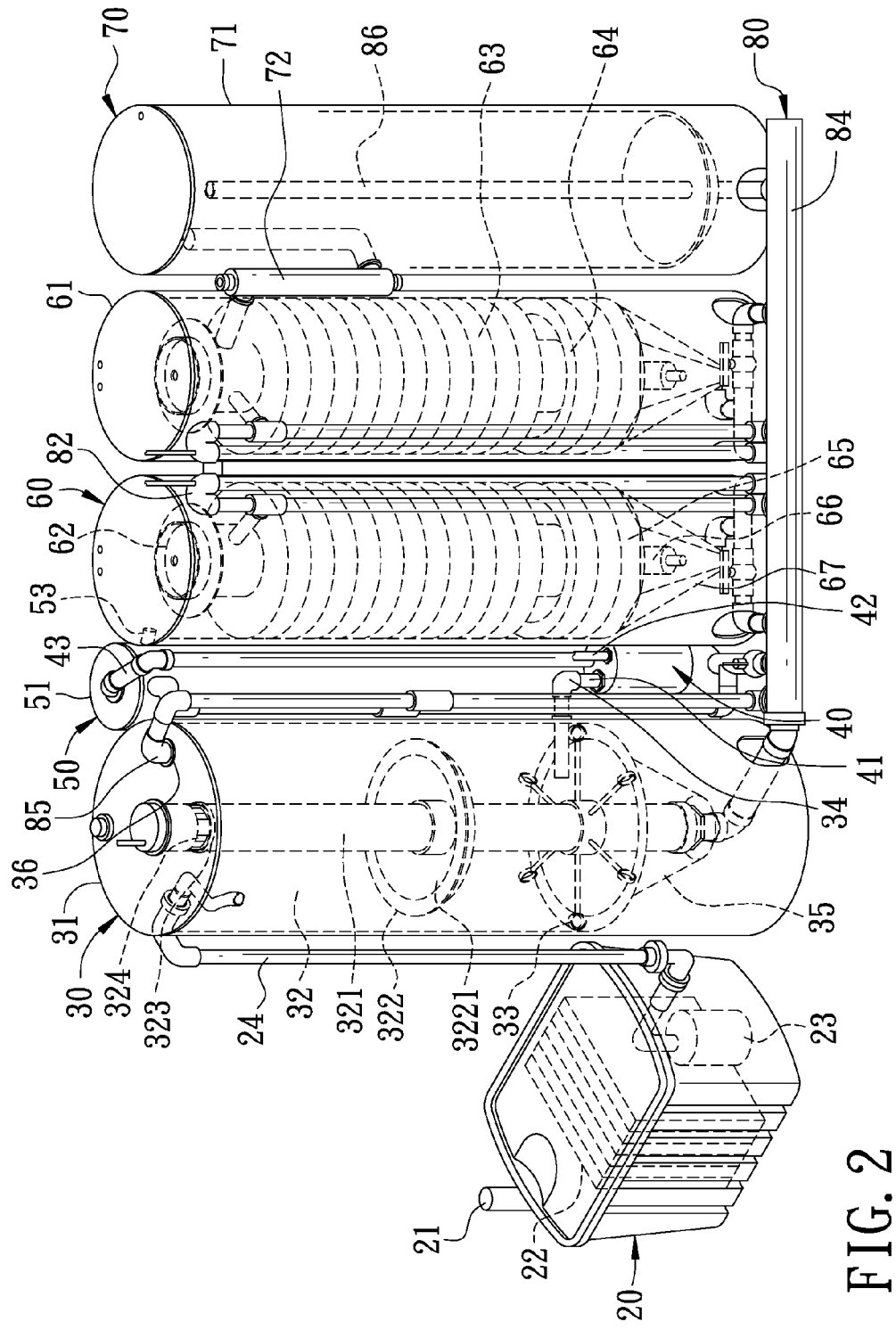
FIG. 2 is a perspective view according to a preferred embodiment of the present invention.

As shown in FIG. 2, a waste water treatment apparatus according to a preferred embodiment of the present invention comprises a physical filter unit 20, a changeable fluid dirt activation unit 30, a pressure pump 40, a deposit unit 50, two microorganism filter units 60, a water storage unit 70, and a dirt discharge device 80.

The physical filter unit 20 has a waste water inlet 21 to communicate with the waste water and a filter screen layer 22 therein. The filter density of the filter screen layer 22 is increased progressively toward the water current direction. In this embodiment, the filter screen layer 22 is formed by winding thermoplastic macromolecule polymer. The filter screen layer 22 has a wire diameter which is decreased progressively toward the water current direction and a gap in the filter screen layer 22 is gradually dense toward the water current direction, so that the molecule which can be filtered by the filter screen layer 22 becomes more and more small. The physical filter unit 20 further comprises a water pump 23 at a distal end thereof to connect with a waste water filter pipe 24.

Figure 3:
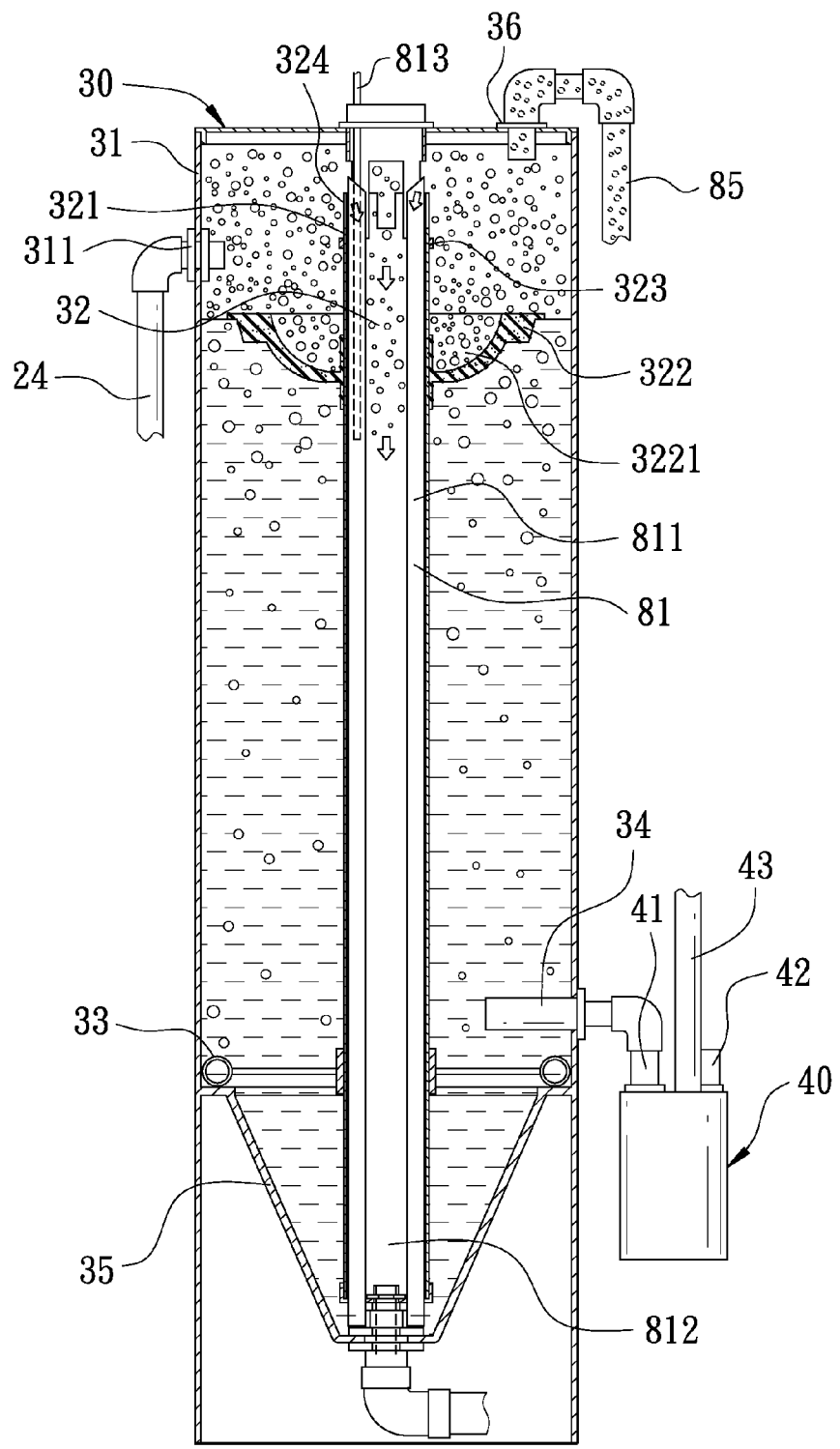
FIG. 3 is a schematic view showing a changeable fluid dirt activation unit and a pressure pump according to the preferred embodiment of the present invention.

FIG. 3 is a cross-sectional view of the changeable fluid dirt activation unit 30. The changeable fluid dirt activation unit 30 comprises an upstanding storage cylinder 31. The storage cylinder 31 has an inlet 311 at a side thereof close to the top of the storage cylinder 31 to communicate with the physical filter unit 20 through the waste water filter pipe 24. The storage cylinder 31 comprises a movable funnel unit 32 at a central portion thereof. The movable funnel unit 32 includes a pipe 321 and a funnel 322. The pipe 321 is fixed at an axis position of the storage cylinder 31. The pipe 321 has a limit portion 323 at an upper end thereof and an outlet 324 above the limit portion 323. The funnel 322 has a trough 3221 facing upward, and the funnel 323 can be axially moved along the pipe 321 according to water level. The storage cylinder 31 further comprises an annular bubble generator 33 therein. The bubble generator 33 is located close to the bottom of the storage cylinder 31. One side wall of the storage cylinder 31 is provided with a storage pipe 34 which is located close to the bottom of the movable funnel unit 32. The storage cylinder 31 further has a conical dirt collection trough 35 at the bottom thereof and a bubble outlet 36 at the top thereof.

The pressure pump 40 comprises a connection pipe 41 to connect with the storage pipe 34, an air pipe 42 and a pressure pipe 43. The storage pipe 34 is connected with the changeable fluid dirt activation unit 30. The air pipe 42 is used to control air input/output of the pressure pump 40. The pressure pipe 43 is used to output the liquid from the changeable fluid dirt activation unit 30.

Figure 4:
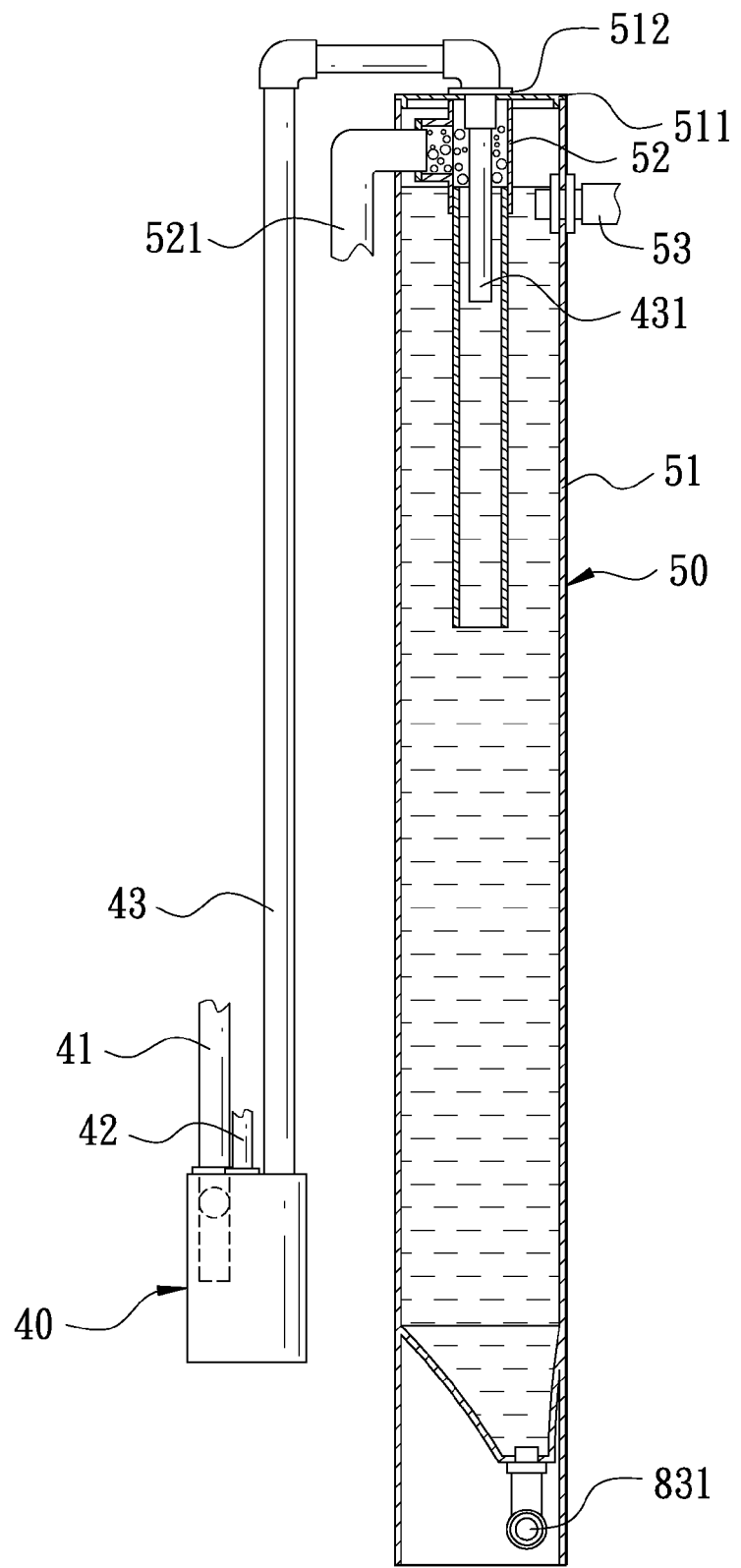
FIG. 4 is a schematic view showing a deposit unit according to the preferred embodiment of the present invention.

The deposit unit 50, referring to FIG. 4, comprises a deposit cylinder 51 and a cover 511 on top of the deposit cylinder 51. The cover 511 has a connection opening 512 for connection of the pressure pipe 43. The cover 511 is connected with a deposit pipe 52 which is located in the deposit cylinder 51. The deposit pipe 52 has a diameter larger than that of the pressure pipe 43. The deposit pipe 52 is connected with an air drain pipe 521 which is provided at an upper side of the deposit pipe 52. The deposit cylinder 51 further comprises a deposit drain pipe 53 which is located at another side of the deposit cylinder 51 above a distal end 431 of the pressure pipe 43.

Figure 5:
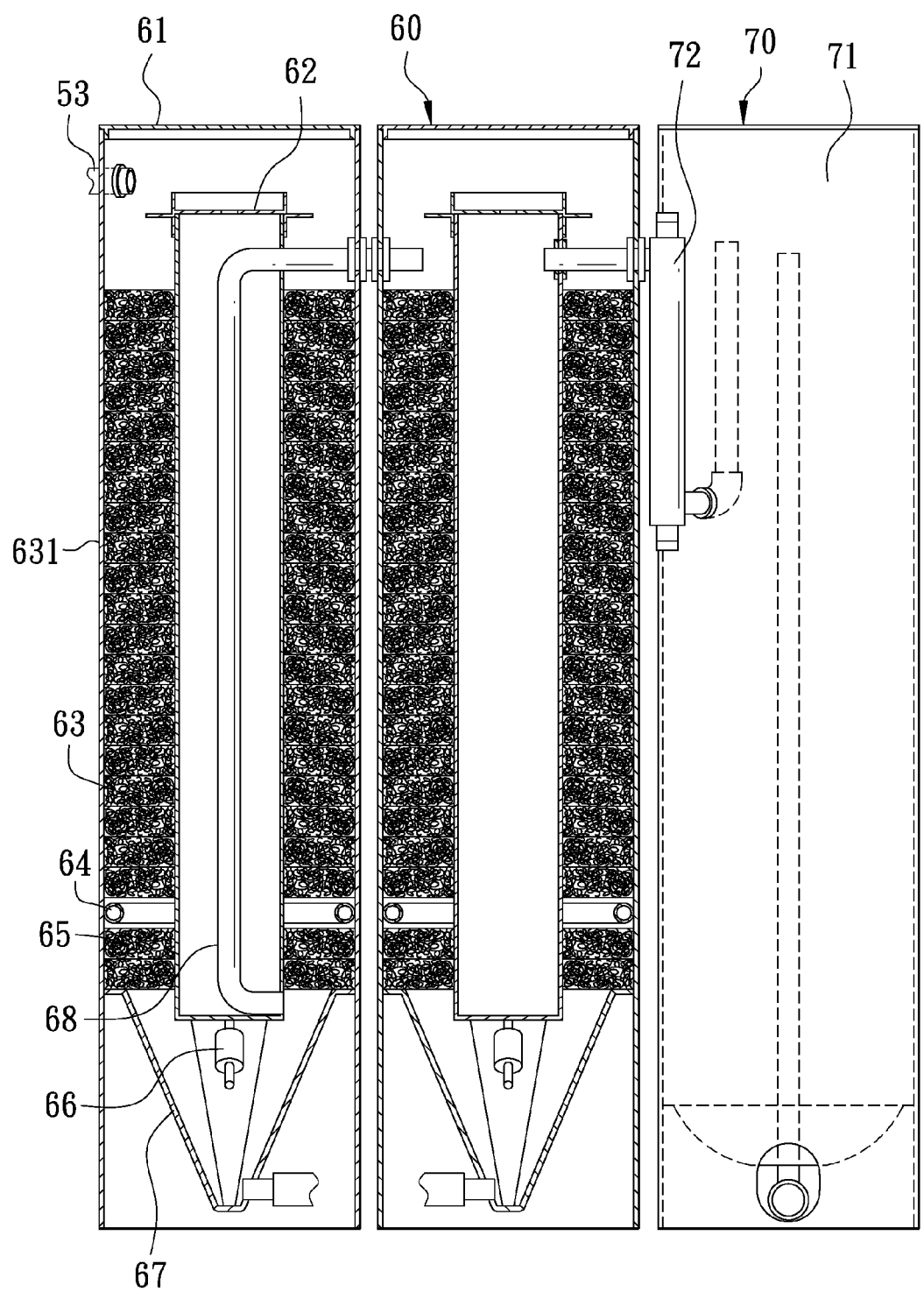
FIG. 5 is a schematic view showing a microorganism filter unit and a water storage unit according to the preferred embodiment of the present invention.
Figure 6:
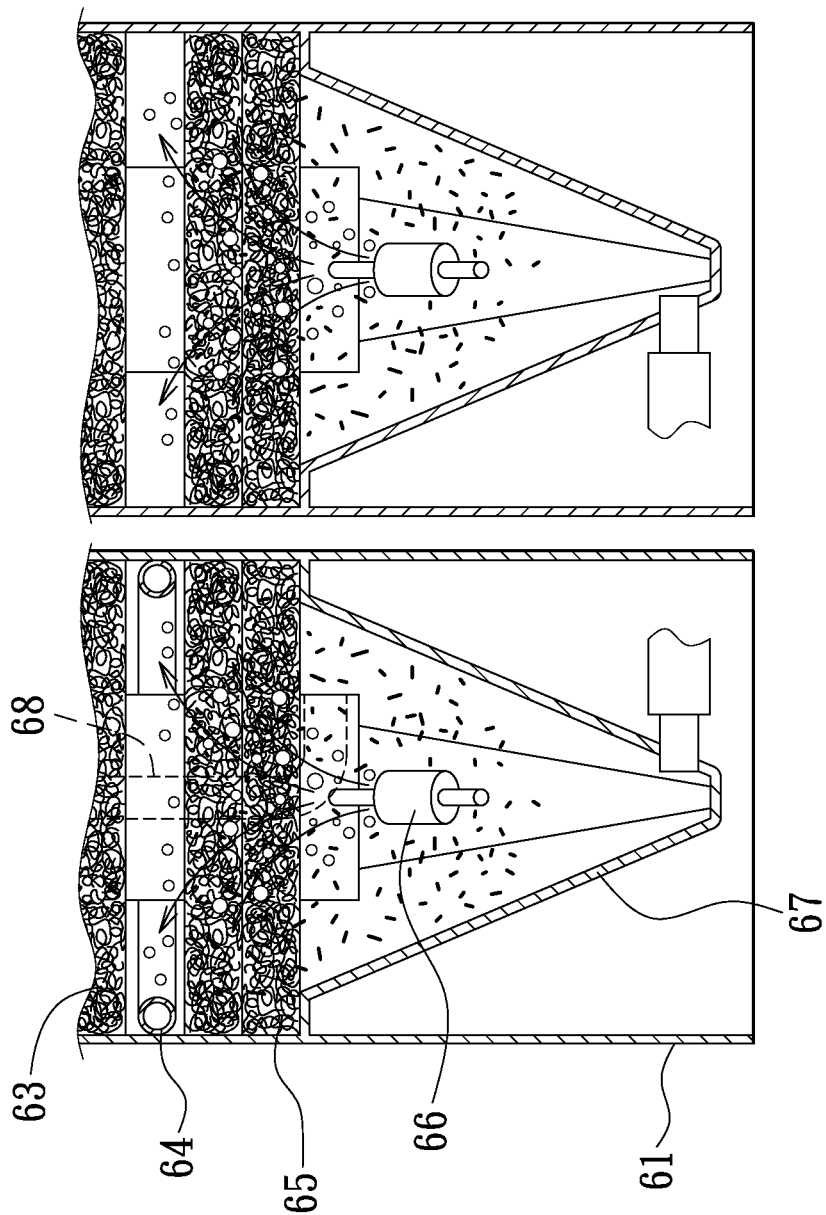
FIG. 6 is an enlarged view showing the operation of the microorganism filter unit according to the preferred embodiment of the present invention.

Referring to FIG. 5 and FIG. 6, each microorganism filter unit 60 comprises a microorganism filter cylinder 61 which is vertically disposed on the ground. The height of the microorganism filter cylinder 61 is larger than its diameter. The microorganism filter cylinder 61 comprises a funnel 62, a microorganism filter screen 63, an air supply ring 64, a filter screen 65, an intermittent air supply device 66 and a conical dirt storage trough 67 therein from top to bottom. The microorganism filter cylinder 61 further comprises a microorganism drain pipe 68 therein. One end of the microorganism drain pipe 68 is disposed at the bottom of the intermittent air supply device 66, and another end of the microorganism drain pipe 68 is disposed on top of the microorganism filter screen 63.

The microorganism filter screen 63 is composed of a plurality of microorganism filter screen units 631 which are connected in series and have a density which is increased progressively toward the water current direction. In this embodiment, the microorganism filter screen 63 is formed by winding thermoplastic macromolecule polymer. The microorganism filter screen 63 has a wire diameter which is decreased progressively toward the water current direction and a gap in the microorganism filter screen 63 is gradually dense toward the water current direction. The filter screen 65 is also formed by winding thermoplastic macromolecule polymer. The microorganism filter screen 63 above the air supply ring 64 is an aeration microorganism filter screen, and the microorganism filter screen 63 below the air supply ring 64 is a non-aeration microorganism filter screen.

The water storage unit 70 comprises a water storage cylinder 71 and an ultraviolet rays (UVC) disinfection device 72 which is connected with the microorganism drain pipe 68 of the microorganism filter unit 60.

Referring to FIG. 2, FIG. 3, FIG. 4 and FIG. 7, the dirt discharge device 80 comprises a first communicating pipe 81, two second communicating pipes 82, a communicating valve 83, a dirt discharge pipe 84, and a top inhaling pipe 85. Referring to FIG. 3, the first communicating pipe 81 has a first inlet end 811 and a first outlet end 812. The first inlet end 811 is disposed in the first outlet end 812. The bottom of the first inlet end 811 is communicated with the dirt collection trough 35 of the change fluid dirt activation unit 30. The top of the first inlet end 811 is connected with a first air inlet pipe 813. The top of the first inlet end 811 is communicated with the first outlet end 812. The first inlet end 811 is communicated with the outlet 324. The bottom of the first outlet end 812 is communicated with the dirt discharge pipe 84.

The second communicating pipe 82 has the bottom of a second inlet end 821 to communicate with the dirt storage trough 67 of the microorganism filter unit 60. The top of the second inlet end 821 is connected with a second air inlet pipe 822. The second inlet end 821 extends upward through a water pipe and is connected with a second outlet end 823. The bottom of the second outlet end 823 is communicated with the dirt discharge pipe 84. Referring to FIG. 4, the communicating valve 83 has a third inlet end 831 at one end. The third inlet end 831 is connected to the bottom of the deposit cylinder 51. The air drain pipe 521 is also communicated with the third inlet end 831. The communicating valve 83 has a third outlet end 831 at another end to communicate with the dirt discharge pipe 84. The communicating valve 83 is used to control opening/closing between the third outlet end 831 and the third inlet end 832. Referring to FIG. 3, the bubble outlet 36 of the changeable fluid dirt activation unit 30 is connected with the top inhaling pipe 85 to communicate with the dirt discharge pipe 84. A top pipe 86 is provided in the water storage cylinder 71 of the water storage unit 70. The top pipe 81 has an opening which is located at a top position of the water storage cylinder 71. The bottom of the top pipe 86 is communicated with the drain discharge pipe 84.

In order to understand the feature, technique and expected efficacy of the present invention, the detailed use of the present invention is described hereinafter.

FIG. 2 and FIG. 3 show the operation of the present invention. The filter screen layer 22 of the physical filter unit 20 is used to filter larger particles. The water pump 23 pumps the waste water to the storage cylinder 31 through the waste water filter pipe 24. The waste water in the storage cylinder 31 will generate bubbles by the bubble generator 33, so that the chemical substance in the waste water will be bubbled through this stage. The bubbles float on the waste water because of lower density. The bubbles also absorb the floating particles of the waste water when rising. The funnel 322 is suspended on top of the waste water. When the bubbles rise to the top of the funnel 322 and break, the floating particles absorbed by the bubble will be collected in the trough 3221 of the funnel 322. When the bubbles are higher than the outlet 324, the bubbles will be guided to first outlet end 812 from the outlet 324 and drained to the dirt discharge pipe 84. When there are too many bubbles and the bubbles reaches the top of the storage cylinder 31, the bubbles will be drained to the dirt discharge pipe 84 through the top inhaling pipe 85 which is connected with the bubble outlet 36. When the waste water rises to move the funnel 322 to the limit portion 323, the floating particles collected in the trough 3221 will be guided out through the first inlet end 812.

Referring to FIG. 3, when the pressure pump 40 is not pressurized, the waste water will be guided into the pump 40 through the storage pipe 34 and then the air pressure will be guided through the air pipe 42. The back pressure valve in the pump 40 will close the storage pipe 34. After the air enters the pump 40, the waste water in the pump 40 will generate pressure because of the increased air volume to guide the waste water into the pressure pipe 43 and then the waste water will flow to the deposit unit 50. In this way, the particles of the waste water won't be damaged and the waste water won't damage blades because of using the pump.

Referring to FIG. 4, the deposit cylinder 51 of the deposit unit 50 receives the waste water from the pressure pipe 43. Because the diameter of the deposit pipe 52 in the deposit cylinder 51 is larger than that of the pressure pipe 43, the flowing speed of the waste water entering the deposit pipe 52 slows down. The bubbles of the waste water from the pressure pipe 43 will be scattered toward the top of the deposit cylinder 51 due to the pressurized air and drained to the third inlet end 831 through the air drain pipe 521 beside the deposit pipe 52. Because the speed of the waste water is reduced, the impurities of the waste water will deposit at the bottom of the deposit cylinder 51. Because the position of the deposit drain pipe 53 is high, the impurities of the waste water won't be drained from the deposit drain pipe 53 to further purify the waste water.

Referring to FIG. 5 and FIG. 6, the waste water flowing to the microorganism filter cylinder 61 will be first filtered by the microorganisms on the microorganism filter screen 63. The air supply ring 64 under the microorganism filter screen 63 is used to generate bubbles. The bubbles will flow upward to provide oxygen for the need of the microorganisms of the microorganism filter screen 63 and to bubble the waste water again. The bubbles will absorb the particles and flow to the funnel 62 and then be drained to the dirt discharge pipe 84 through the second outlet end 823. The filter screen 65 is used to filter the dead bodies of the microorganisms. The intermittent air supply device 66 is used to provide intermittent bubbles to spoil the connection of the dead bodies, such that the filter screen 65 won't be clogged by the dead bodies of the microorganisms after a period of time. The filtered water flows to the next microorganism filter cylinder 61 through the microorganism drain pipe 68. The second microorganism filter cylinder 61 is connected to the ultraviolet (UVC) disinfection device 72 through the microorganism drain pipe 68 for disinfection. The water is stored in the water storage cylinder 71 for use. When the water in the water storage cylinder 71 is too much, the water will be drained to the dirt discharge pipe 84 through the top pipe 86.

Figure 7:
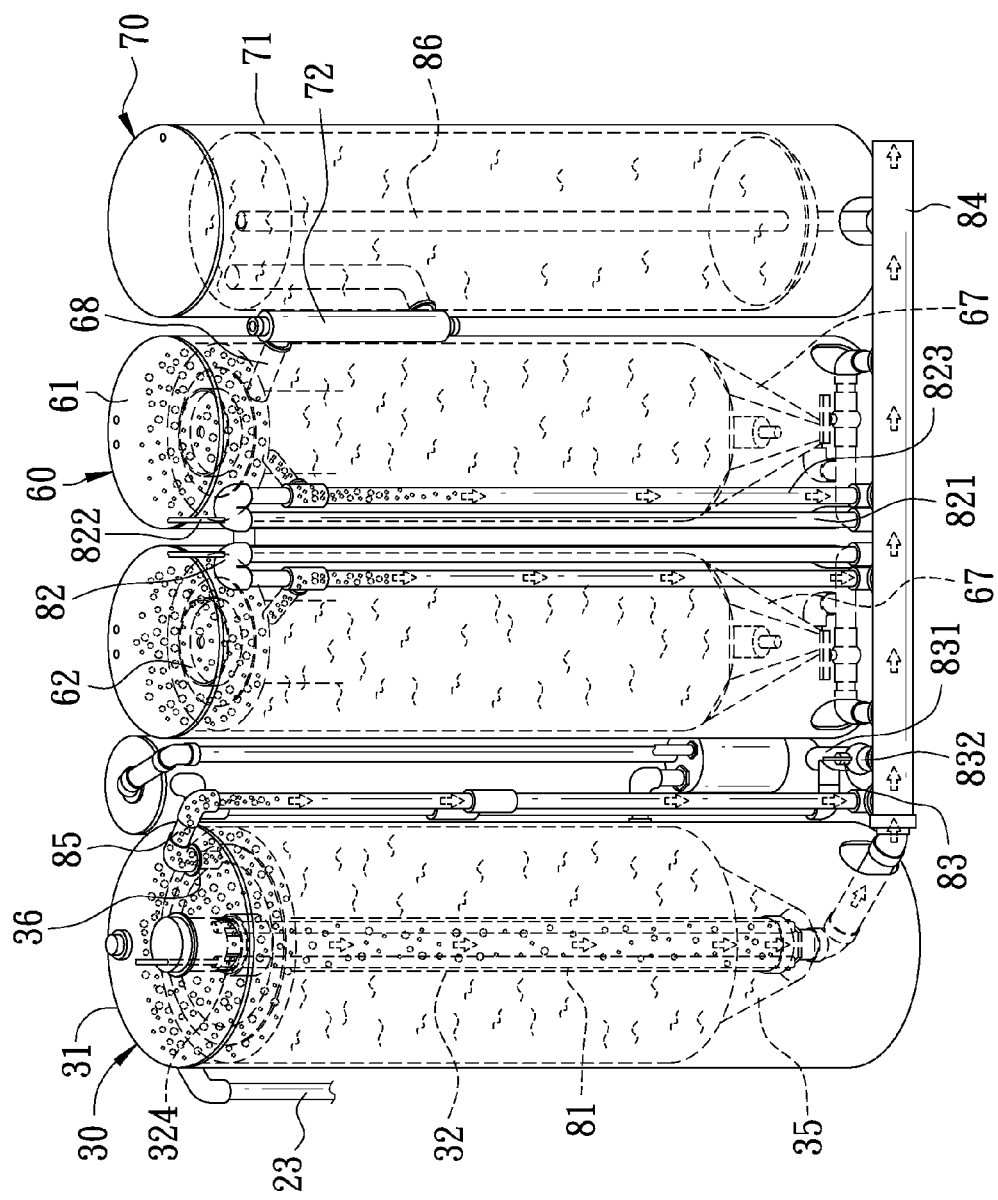
FIG. 7 is a schematic view showing the preferred embodiment of the present invention connected with a dirt discharge device.
Figure 8:
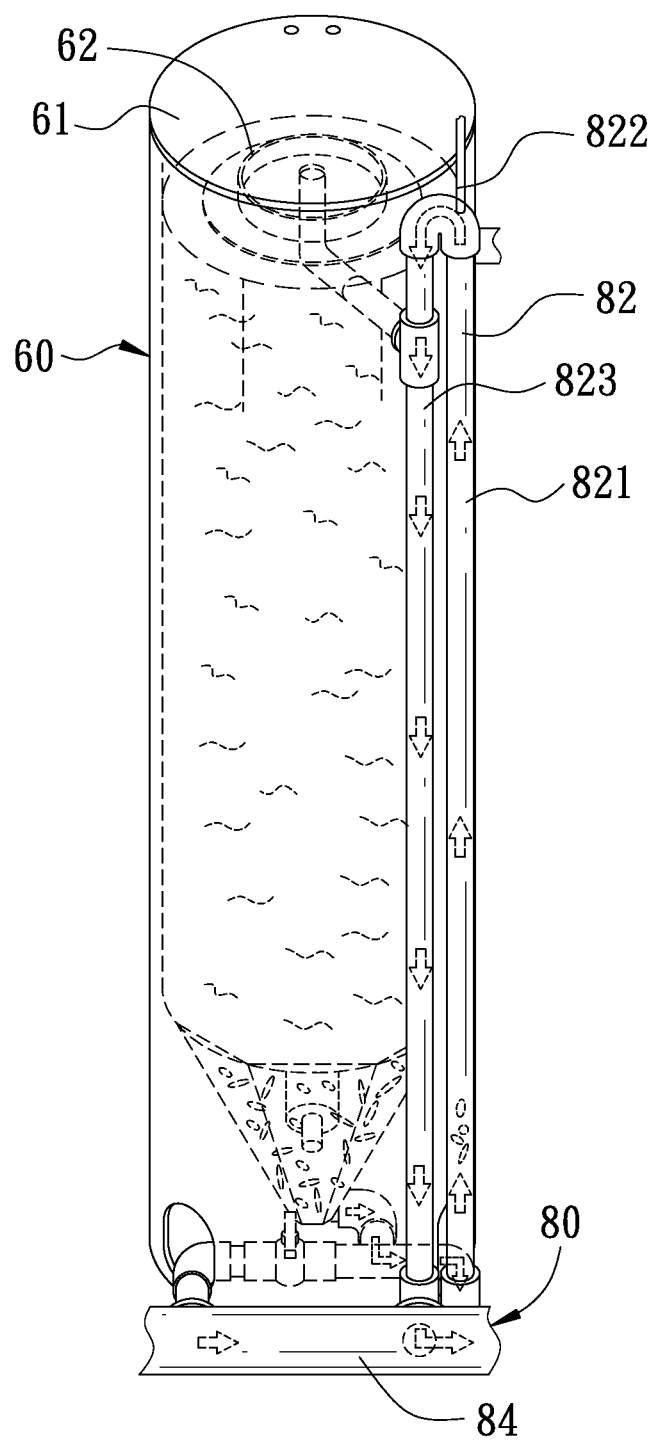
FIG. 8 is a schematic view showing the operation of the dirt discharge device according to the preferred embodiment of the present invention.

FIG. 7 and FIG. 8 show the operation of the dirt discharge device of the present invention. When the impurities in the dirt storage trough 67 of the microorganism filter cylinder 61 has a certain amount, the second air inlet pipe 822 will input the air. After the air enters the second inlet end 821, the volume of the air will be distended because the diameter of the pipe becomes large. The water in the second inlet end 821 will be pushed upward and guided to the second outlet end 823 subject to the change of the volume of the air. This moment, because the water in the second inlet end 821 is reduced and the bottom of the second inlet end 821 is communicated with the microorganism filter cylinder 61, the impurities at the bottom of the microorganism filter cylinder 61 will be guided to the second inlet end 821 gradually to make up the reduced water and then drained through the second outlet end 823 to clear up the impurities of the dirt storage trough 67. The first communicating pipe 81 disposed in the dirt collection trough 35 of the changeable fluid dirt activation unit 30 is used to guide the air from the first air inlet pipe 813 to the first inlet end 811, and the distended air brings the water from the first inlet end 811 to the first outlet end 812 and to drain the impurities in the dirt collection trough 35 in the same principle.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A waste water treatment apparatus, comprising:
   a physical filter unit having a waste water inlet at a front end thereof, the physical filter unit comprising a filter screen layer therein to filter impurities which are large particles, and a waste water filter pipe disposed at a distal end thereof;
   a changeable fluid dirt activation unit comprising a storage cylinder, a side of the storage cylinder close to a top of the storage cylinder being connected with the physical filter unit through the waste water filter pipe, the storage cylinder comprising a movable funnel unit at a central portion thereof, the storage cylinder further comprising an annular bubble generator therein, the bubble generator being located close to a bottom of the storage cylinder, a side wall of the storage cylinder being provided with a storage pipe, the storage cylinder further having a dirt collection trough at the bottom thereof and a bubble outlet at the top thereof;
   at least one microorganism filter unit having a top to communicate with the changeable fluid dirt activation unit, the microorganism filter unit comprising a microorganism filter cylinder, the microorganism filter cylinder comprising a funnel, a microorganism filter screen, an air supply ring, a filter screen, an intermittent air supply device and a dirt storage trough therein from top to bottom, the microorganism filter cylinder further comprising a microorganism drain pipe inside, one end of the microorganism drain pipe being is disposed at a bottom of the intermittent air supply device and another end of the microorganism drain pipe being disposed on top of the microorganism filter screen; and
   a water storage unit comprising a water storage cylinder, the water storage unit being connected with the microorganism drain pipe above the microorganism filter screen.

2. The waste water treatment apparatus as claimed in claim 1, wherein the filter screen layer of the physical filter unit is formed by winding thermoplastic macromolecule polymer, the filter screen layer has a wire diameter which is decreased progressively toward a water current direction, and a gap in the filter screen layer is gradually dense toward the water current direction.

3. The waste water treatment apparatus as claimed in claim 1, wherein the movable funnel unit includes a pipe and a funnel, the pipe is fixed at an axis position of the storage cylinder, the funnel has a trough facing upward which is disposed on an outer wall of the pipe, the pipe has a limit portion at an upper end thereof and an outlet above the limit portion, and the funnel being axially moved along the pipe according to water level.

4. The waste water treatment apparatus as claimed in claim 1, wherein the storage pipe is located close to a bottom of the movable funnel unit.

5. The waste water treatment apparatus as claimed in claim 1, wherein the microorganism filter screen of the microorganism filter unit is formed by winding thermoplastic macromolecule polymer, the microorganism filter screen has a wire diameter which is decreased progressively toward a water current direction, and a gap in the microorganism filter screen is gradually dense toward the water current direction.

6. The waste water treatment apparatus as claimed in claim 5, wherein the microorganism filter screen is composed of a plurality of microorganism filter screen units which are connected in series.

7. The waste water treatment apparatus as claimed in claim 1, wherein the microorganism filter screen above the air supply ring is an aeration microorganism filter screen, and the microorganism filter screen below the air supply ring is a non-aeration microorganism filter screen.

8. The waste water treatment apparatus as claimed in claim 1, wherein a pressure pump is provided between the changeable fluid dirt activation unit and the microorganism filter unit for pumping fluid.

9. The waste water treatment apparatus as claimed in claim 8, wherein the pressure pump comprises an air pipe and a pressure pipe, and a back pressure valve is provided in the pressure pump to adjust the direction of water flow.

10. The waste water treatment apparatus as claimed in claim 1, further comprising a deposit unit, the deposit unit comprising a deposit cylinder, a top of the deposit cylinder being connected with a pressure pipe of a pressure pump, the top of the deposit cylinder being provided with a deposit pipe, the deposit pipe having a diameter larger than that of the pressure pipe, the deposit cylinder further comprising a deposit drain pipe which is located at an upper side of the deposit cylinder, the deposit drain pipe being connected with the microorganism filter unit.

11. The waste water treatment apparatus as claimed in claim 1, wherein the water storage unit further comprises an ultraviolet rays (UVC) disinfection device.

12. The waste water treatment apparatus as claimed in claim 1, further comprising a dirt discharge device, the dirt discharge device having an inlet end, the inlet end being respectively communicated with the dirt collection trough of the change fluid dirt activation unit and the dirt storage trough of the microorganism filter unit, the dirt discharge device having an outlet end to communicate with the dirt discharge pipe.

13. The waste water treatment apparatus as claimed in claim 12, wherein the dirt discharge device further comprises a communicating pipe and a communicating valve which is disposed between the inlet end and the outlet end.

14. The waste water treatment apparatus as claimed in claim 12, wherein a top of the inlet end of the dirt discharge device is connected with an air inlet pipe, the top of the inlet end is communicated with the outlet end, and a bottom of the outlet end is communicated with the dirt discharge pipe.

15. The waste water treatment apparatus as claimed in claim 12, wherein the dirt discharge device further comprises a top inhaling pipe connected to the bubble outlet to communicate with the dirt discharge pipe.

16. The waste water treatment apparatus as claimed in claim 12, wherein a top pipe is provided in the water storage cylinder of the water storage unit, and the top pipe is communicated with the drain discharge pipe.

* * * * *